(12) United States Patent
Demant et al.

(10) Patent No.: US 8,881,056 B2
(45) Date of Patent: Nov. 4, 2014

(54) DYNAMIC VIEW COMPUTATION AND DISPLAY

(75) Inventors: Hilmar Demant, Karlsdorf (DE); Sebastian Droll, Heidelberg (DE); Joachim Fitzer, Schriesheim (DE); Ioannis Grammatikakis, Maxdorf (DE); Jan Heiler, Walldorf (DE); Juergen Sattler, Wiesloch (DE); Frank Schertel, Mannheim (DE); Markus Viol, Walldorf (DE); Thorsten Weber, Mannheim (DE)

(73) Assignee: SAP SE, Walldorf (DE)

(*) Notice: Subject to any disclaimer, the term of this patent is extended or adjusted under 35 U.S.C. 154(b) by 696 days.

(21) Appl. No.: 12/871,414

(22) Filed: Aug. 30, 2010

(65) Prior Publication Data

US 2012/0054677 A1    Mar. 1, 2012

(51) Int. Cl.
*G06F 3/00* (2006.01)
*G06F 3/048* (2013.01)
*G06F 9/44* (2006.01)
*G06F 3/14* (2006.01)

(52) U.S. Cl.
CPC .............. *G06F 3/048* (2013.01); *G06F 9/4443* (2013.01); *G06F 3/14* (2013.01)
USPC .......................................... 715/810; 715/751

(58) Field of Classification Search
USPC .......................................................... 715/751
See application file for complete search history.

(56) References Cited

U.S. PATENT DOCUMENTS

| | | | | |
|---|---|---|---|---|
| 7,921,353 | B1 * | 4/2011 | Murray | 715/200 |
| 7,991,916 | B2 * | 8/2011 | Meek et al. | 709/248 |
| 8,280,925 | B2 * | 10/2012 | Arthursson et al. | 707/810 |
| 2007/0055932 | A1 * | 3/2007 | Glein et al. | 715/526 |
| 2007/0288856 | A1 * | 12/2007 | Butlin et al. | 715/762 |
| 2008/0115067 | A1 * | 5/2008 | McLean et al. | 715/751 |
| 2009/0006282 | A1 * | 1/2009 | Roth et al. | 706/12 |
| 2009/0235186 | A1 * | 9/2009 | Howard et al. | 715/760 |
| 2010/0023855 | A1 * | 1/2010 | Hedbor et al. | 715/234 |
| 2010/0185953 | A1 * | 7/2010 | Grandemenge | 715/743 |
| 2011/0219311 | A1 * | 9/2011 | Diament et al. | 715/736 |
| 2011/0252312 | A1 * | 10/2011 | Lemonik et al. | 715/255 |
| 2012/0054677 | A1 * | 3/2012 | Demant et al. | 715/810 |
| 2012/0102392 | A1 * | 4/2012 | Reesman et al. | 715/243 |
| 2012/0159303 | A1 * | 6/2012 | Friedrich et al. | 715/227 |
| 2012/0159311 | A1 * | 6/2012 | Hanssen et al. | 715/243 |

FOREIGN PATENT DOCUMENTS

EP    2156784 A1 *    2/2010 ............ A61B 1/05

* cited by examiner

*Primary Examiner* — Ryan Pitaro
(74) *Attorney, Agent, or Firm* — Brake Hughes Bellermann LLP (57) ABSTRACT

Methods and apparatus for displaying objects in client GUI. A lead selection and scoping information is used to determine whether the object is viewable, and the object is rendered only if it is at least partially viewable. The lead selection and scoping information is used to determine whether data is needed to render the object, and data is received from a corresponding object on a server only if it is needed to render the object. Determining whether the object is viewable in the GUI can be based on declaratively marked entities within the object's view and on view calculation rules. Determining whether data is needed to render the object can be based on declaratively marked entities within the object's data model such as flags indicating whether the data field is valid or whether the binding of the data field to a data source is valid.

20 Claims, 7 Drawing Sheets

DYNAMIC VIEW COMPUTATION AND DISPLAY

TECHNICAL FIELD

This description relates to client/server based applications, and the visibility and population of client based objects in a graphical user interface.

BACKGROUND

Today, business is often conducted via portable and hand-held computers. Devices such as smart phones, personal digital assistants, tablet based computers and netbooks, to name just a few, have a small physical footprint yet a rich graphical user interface. As such, they are well suited for data presentation and remote business use. While the computing power of such devices is considerable, it nonetheless pales in comparison to the computing power of a server or server farm. The same can be said of desktop and laptop computers. While such computers provide rich graphical user interfaces and posses considerable computing power in their own right, absolute computing power pales in comparison to the computing power of a server or server farm. As a result, many computationally intensive applications are most effectively run on servers or server farms. Still, it is often convenient to remotely access the data that is output by such computationally intensive applications on small footprint, hand-held devices or on simple desktop or laptop computers. For example, a salesperson can benefit from having instant access to all of the sales records of his or her customers, including detailed records of orders placed, shipments made, invoices sent, and payments received over a period of several years. Depending on the number and size of the customers, such records can be voluminous, and maintaining and analyzing them can be a computationally intensive task that is best left to an enterprise server or server farm. Nonetheless, the salesperson may benefit from having instant access to and the ability to mine the sales information to address issues that may arise during a sales call or while working on his or her desktop preparing to make a sales call. Moreover, the enterprise can benefit by allowing the salesperson to have write access to the sales records from any remote computer, thereby allowing the sales person to enter new or useful sales information such as the name and contact information of a customer's new purchasing agent.

Achieving both of these goals, i.e., running data intensive applications on server farms where they are most efficiently run while providing access to the output of these applications on remote devices like laptops, desktops or smart phones where they may most urgently be needed, can be accomplished using a client-server computing paradigm. In this paradigm, a client application running on a remote device can interface with and control a server application running on an enterprise server or server farm. The client based application can send commands and data to the server, while the server can execute the commands and return requested or updated data to the client. The information exchanged between the client and server systems in such a client-server computing architecture can often strain the communications link that exists between the systems, especially when large amounts of data are transferred. Thus, techniques for reducing the amount of data that is transferred between the client and server without reducing the utility of the entire client-server architecture are provided.

SUMMARY

In one aspect, a computer implemented method for displaying objects in a graphical user interface is disclosed. A lead selection and a component object for display in a graphical user interface is received on a client computer. The component object has a view and at least one data field. The lead selection and scoping information about the view of the component object is used to determine whether the component object is at least partially viewable in the graphical user interface. The component object is rendered on the client computer if it is at least partially viewable in the graphical user interface. The lead selection and scoping information about the at least one data field in the component object is used to determine whether data for the at least one data field is needed to render the component object in the graphical user interface. The data for the at least one data field is received from a corresponding component object on a server computer if it is needed to render the component object in the graphical user interface on the client computer.

Features of the invention may include one or more of the following. The determination whether the component object is at least partially viewable in the graphical user interface is based on declaratively marked entities within the view of the component object. The determination can be made by an event handler within the component object. The determination can be based on view calculation rules. The determination whether data for the at least one data field is needed to render the component object is based on declaratively marked entities within a data model of the component object. The determination can be made by an event handler within the component object. The determination can be based on a flag in the data model indicating whether the data field is valid. The determination can be based on a flag in the data model indicating whether the binding of the data field to a data source is valid.

In another aspect, a system for displaying objects in a graphical user interface is disclosed. The system can include one or more processors loaded with instructions that execute on the one or more processors. The processors, when executing the loaded instructions, can act as a view layout manager, a data scope manager and a controller. The view layout manager can render and display a component object having a view and at least one data field in a graphical user interface on a client computer when the component object is at least partially viewable in the graphical user interface. The data scope manager can determine whether the component object is at least partially viewable in the graphical user interface and whether data for the at least one data field is needed to render the component object in the graphical user interface. The controller can retrieve data for the at least one data field from a corresponding component object on a server computer if the data is needed to render the component object in the graphical user interface on the client computer.

Features of the invention can include one or more of the following. The data scope manager can determine whether the component object is at least partially viewable in the graphical user interface based on declaratively marked entities within the view of the component object. The data scope manager can use view calculation rules within the view of the component object to determine whether the component object is at least partially viewable in the graphical user interface. The data scope manager can determine whether data for the at least one data field is needed to render the component object based on declaratively marked entities within a data model of the component object. The declaratively marked entities can include a flag in the data model indicating whether the data field is valid. The declaratively marked entities can include a flag in the data model indicating whether the binding of the data field to a data source is valid.

DETAILED DESCRIPTION

Figure 1:
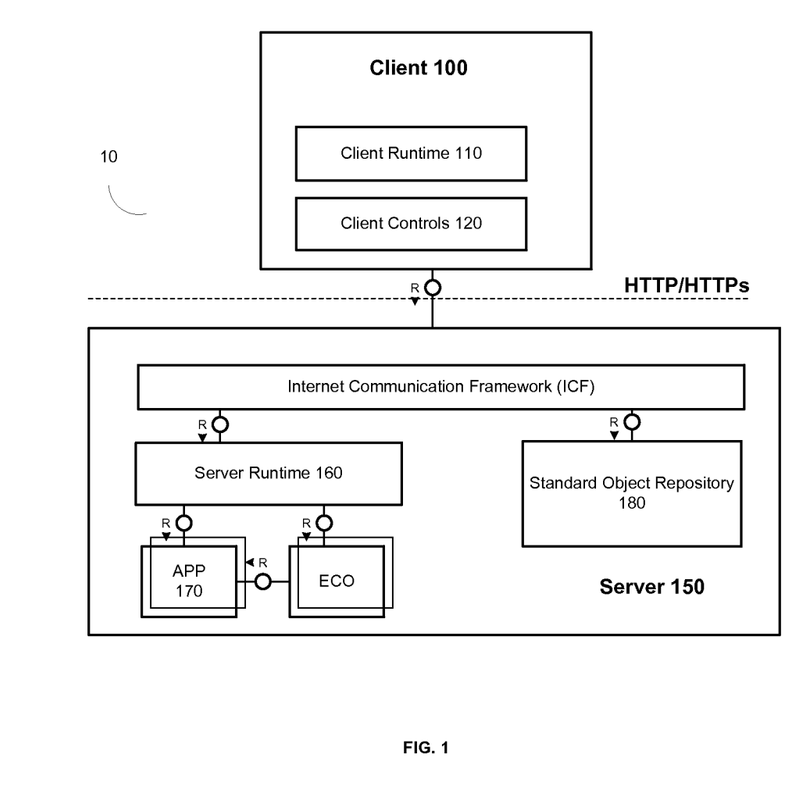
FIG. 1 is a block diagram of a system, including client and server computers, for executing an application using a client-server architecture.

FIG. 1 is a block diagram of a system 10 for executing an application using a client-server architecture. As shown in FIG. 1, system 10 includes a client computer 100 and a server computer 150. The client computer 100 runs a client runtime 110 that includes one or more controls 120. The server computer 150 runs a server runtime 160 and a backend application 170. The client runtime 110 generates and renders a graphical user interface (GUI) that allows a user of client computer 100 to graphically interact with and control the backend application 170 on server 150. The server runtime 160 communicates with both the client runtime 110 on client computer 100 and the backend application 170 on server 150. The server runtime 160 reads, writes, interprets, and translates data from backend application 170 into one or more declared UI component objects (see, FIG. 2) using a data model that is common to both the client runtime 110 and the server runtime 160. Preferably, the client runtime 110 is implemented as a browser plug-in, and executed as part of a browser running on client computer 100. Alternatively, a standalone client runtime (not shown) can be separately compiled, installed, and run independently of any browser running on client computer 100. Preferably, client runtime 110 and server runtime 160 communicate via hyper text transport protocol (HTTP), and exchange data using Java Script Object Notation (JSON). In other embodiments, client runtime 110 and server runtime 160 can communicate via secure HTTP (HTTP/s), and can exchange data using XML. Further details of client runtime 110 and server runtime 160 are provided below.

Figure 2:
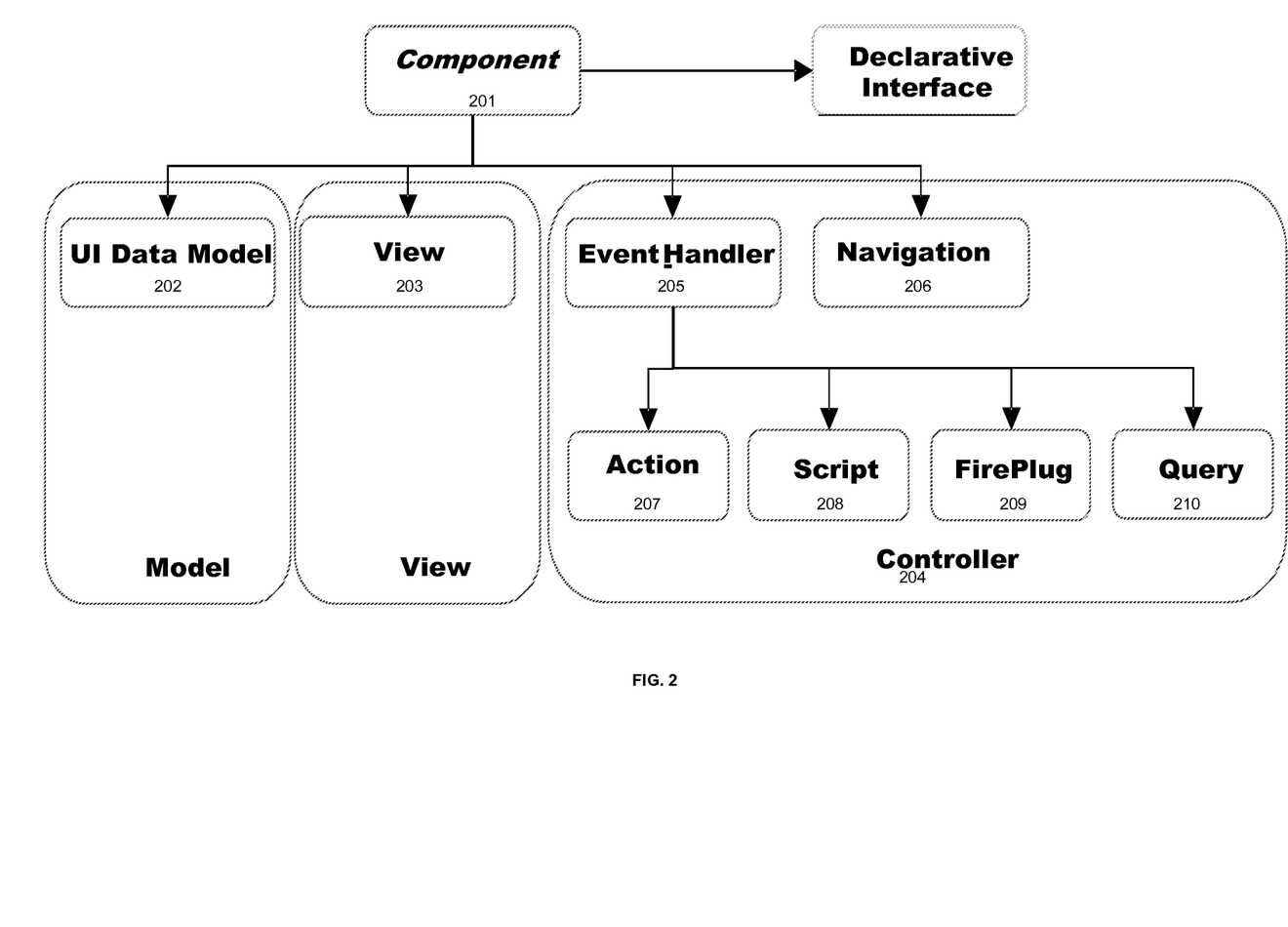
FIG. 2 is a schematic illustration of a declared UI component object.

FIG. 2 is a schematic illustration of a declared UI component object. UI component object 201 includes a data model 202, a view 203, and a controller 204. The data model 202 defines a more universal data structure that is abstracted from the particular data and logic of the backend application 170. The view 203 describes the representation of the component object 201 and data from the data model 202 in a graphical user interface on the client computer 100. Through the UI component's view, event-handlers can be triggered when a user interacts with the component object. The controller 204 provides various means for handling and manipulating the data that is defined in the data model 202 of the component object 201. In particular, the controller 204 includes one or more event handlers 205 and one or more navigation paths 206. The event handlers 205 interpret events that occur within the client runtime 110 or server runtime 160, and bind data fields in the component object 201 to data sources (e.g., backend application 170) per the data model 202. The event handlers 205 can bind data fields to data sources through actions 207 (e.g., calling a function in application 170), scripts 208, or queries 210 (e.g., querying the data source). Finally, the navigation paths 206 describe the mapping of operations and the flow of data between the component object 201 and other component objects in the client runtime 110, particularly when data in one component object depends on data in another component object. For example, if data in a component object 250 (not shown) depends on data in component object 201, controller 204 can include a navigation path 206 that connects component objects 201 and 250. Controller 204 can use the navigation path 206 to notify component object 250 when the data in component object 201 changes. Component object 250 can be embedded in component object 201, or component object 250 can be external to component object 201.

Each UI component object 201 is instantiated on both the client computer 100 and the server computer 150. Data in the client and server sides of the component object 201 are synchronized on an as needed basis. Thus, the client runtime 110 and server runtime 160 only exchange data that needs to be exchanged to maintain the current state of the UI and of the component objects 201 in both the client runtime 110 and the server runtime 160. Data fields in the client side of a component object 201 are bound to corresponding data fields on the server side of the component object, while data fields in the server side of the component object 201 are bound to data sources on the server 150 such as the backend application 170.

To improve system performance and preserve bandwidth on the communication channel between the client computer 100 and the server 150, only data that is currently needed or viewable is loaded from the backend application 170. For example, when data is retrieved from application 170 to populate a list object 201 on the client computer 100, the controller 204 for the list object 201 sends the current lead selection and other information from the current view 203 of the list object 201 to the server runtime 160. The server side list object 201 uses this information to query the application 170 for only those items in the list object 201 that are currently viewable in the view 203 of the client side list object 201. Similarly, if the client side list object 201 is a hierarchical list, the client list object 201 does not receive data needed to populate a child list object unless the child list object is the current lead selection of the client side list object 201. Thus, the child list object appears in a collapsed state when it is not the current lead selection in the client side list object 201, and appears in an expanded state when it is the current lead selection in the client side list object 201.

Changes made to data fields that are not in the current scope, focus, or lead selection of the user interface can nonetheless be made available to the client runtime 110 through a bound property framework. This framework allows the client runtime 110 to receive event notifications of changes that are made to out-of-scope or out-of-focus data fields by creating proxy objects having logical paths to the data fields. The client runtime 110 can be alerted to changes in the data fields monitored by the proxy objects regardless of whether the data fields are within the current focus, scope or lead selection of the client runtime 110. For example, a data model can consist of a sales order containing a list of items being sold, which list can contain one or more sub-lists containing details about each of the items on the sales list. If a user wanted to monitor for changes to the detailed sub-list (e.g., so the only items on the list are items that are made of stainless steel), the user could create a proxy object within the client runtime with a logical path such as "SalesOrder/Items/Details/Composition" that would alert the user to changes made to the composition of items on the list, regardless of whether the items were currently within the focus of the user interface.

Figure 3:
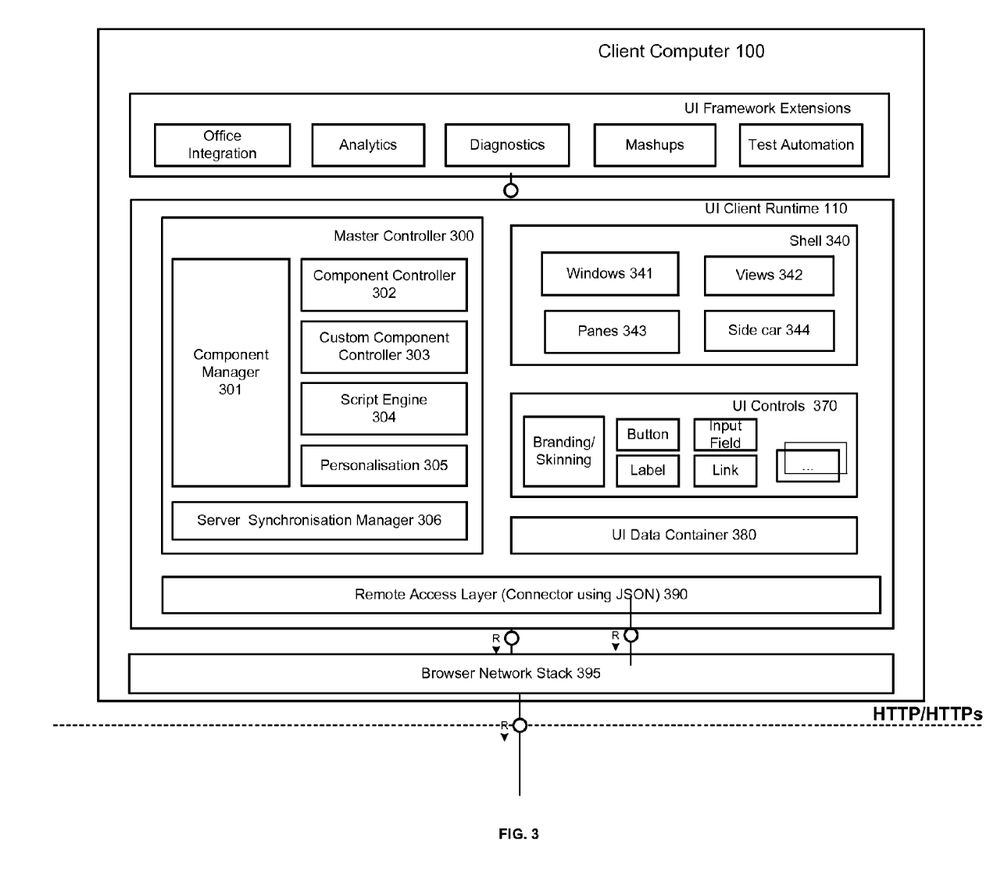
FIG. 3 is a block diagram of a client computer, including a client runtime that is capable of generating a UI for interacting with an application running on a server computer.

FIG. 3 is a block diagram of a client computer 100, including a client runtime 110 that is capable of generating a UI for executing an application 170 running on a server 150 in a client-server architecture. As shown in FIG. 3, the client runtime 110 includes a master controller 300, a shell 340, one or more UI controls 370, a UI data container 380, and a communications interface capable of establishing communication with a server runtime 160 on the server 150. In one implementation, the communications interface includes a JSON connector 390 and a browser stack 395. The master controller 300 includes a component manager 301, one or more component controllers 302 or custom component controllers 303, and a server synchronization manager 306. The master controller 300 may also include a scripting engine 304 and a personalization engine 305. The component manager 301 instantiates component objects 201 (see, FIG. 2) that make up the UI for the client runtime 110, and triggers the initialization of component objects 201 with data that is obtained from a data source such as backend application 170 running on server 150. The component objects 201 can be constructed from standardized UI controls 370, which can be obtained from a standard object repository 450 (see, FIG. 4) that is located on server 150. All component objects 201 in the client runtime 110 can be composed from the standard UI controls 370 or from other component objects 201. The top-level component object in the client runtime 110 can render a shell 340, which can consist of various windows 341, component object views 342 (i.e., views 203 of component objects 201), panes 343 and side cars 344 for personalization and help.

When the component manager 301 instantiates a component object, it also instantiates a controller 302 or 303 for the component object (i.e., a controller 204 for each component object 201 as shown in FIG. 2). The component manager 301 instantiates a standard component controller 302 for each UI control 370, and a custom component controller 303 for each composite component object (e.g., each component object that consists of two or more UI controls 370 or other UI component objects). As explained above in reference to FIG. 2, each component controller 302 or 303 binds the data fields of its component object to a data source (e.g., application 170) through an event handler 205 according to a data model 202. If data is bound to a component object 201 through a script, controllers 302 or 303 can trigger script engine 304 to execute that script. Each controller 302 or 303 can also trigger a refresh request and roundtrip data exchange with the server runtime 160 upon detecting a change to the data that is bound to its component object. These refresh requests and data exchanges are managed by a synchronization manager 306. The synchronization manager 306 identifies any data changes in a component object in the client runtime 110, and sends a refresh request to the server runtime 160 to reflect that data change in the corresponding server side component object.

Figure 4:
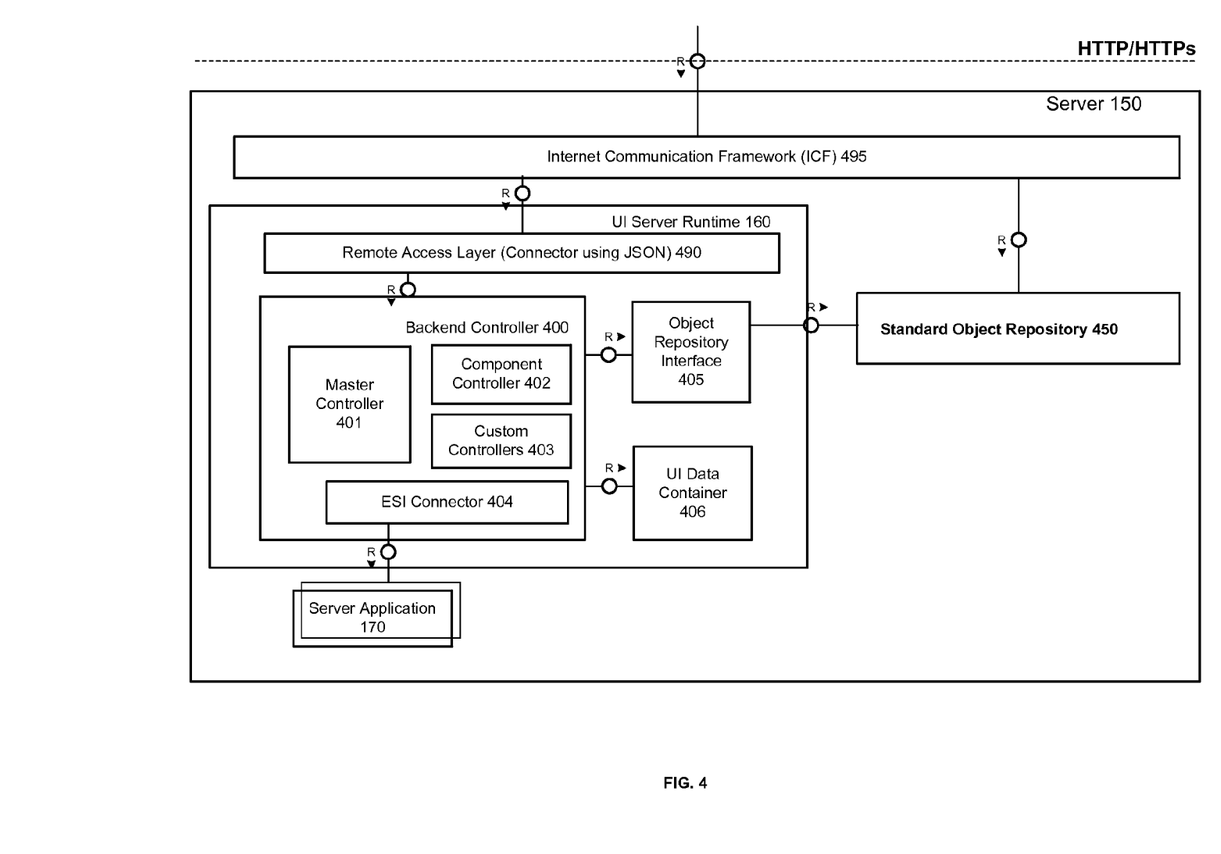
FIG. 4 is a block diagram of a server computer, including a server runtime that interfaces a client runtime running on a client computer with a data source running on the server.

FIG. 4 is a block diagram of a server 150, including a server runtime 160 that interfaces a client runtime 110 running on a client computer 100 with a data source such as an application 170 running on the server 150. The server runtime 160 includes a backend controller 400, an object repository interface 405, and a communications interface that is capable of connecting the server runtime 160 with a client runtime 110 on the computer 100. In one implementation, the communications interface includes an Internet Communications Framework 495 and a JSON connector 490. The backend controller 400 includes a master controller 401, one or more component controllers 402 or custom controllers 403, and a connector 404 to the application 170 running on the server 150. The object repository interface 405 connects the server runtime 160 with a standard object repository 450. The standard object repository 450 contains standardized UI component objects and controls, including standard data models that bind the data in the component objects and controls to a data source on server 150 such as application 170.

When a client runtime 110 is initialized on client computer 100, the client runtime 110 requests one or more UI component objects (which may be controls) from the server runtime 160, receives and instantiates the one or more UI component objects on the client computer 100, and requests initialization of the one or more component objects through the server runtime 160. When the server runtime 160 receives a request for a UI component object from the client runtime 110, it directs the request to the master controller 401. The master controller 401 retrieves the component object and its data model from the standard object repository 450, sends the component object and its data model to the client runtime 110. The master controller 401 also creates, within the service runtime 160, a component controller 402 or custom controller 403 and a data container 406 for the component object. The data container 406 stores data for the component object in a data structure defined by the component object's data model.

When the server runtime 160 receives the request to initialize the component object from the client runtime 110, it again directs the request to the master controller 401. The master controller 401 sends the request to the controller 402 or 403 of the component object. The controller 402 or 403 retrieves the initialization data from a data source on server 150 such as application 170, stores the data in the data container 406 for the component object, and sends the data to the synchronization manager 306 within the client runtime 110. The synchronization manager 306 in turn sends the data to the controller 302 or 303 of the client side component object, which writes the data to the client side data container 380 in the client runtime 110.

Subsequently, whenever the synchronization manager 306 on the client runtime 110 requests a refresh or roundtrip data exchange for a client side component object, the server side controller 402 or 403 for that component object receives and processes the request. For example, when data in a client side component object 201 is changed in the client runtime 110 (e.g., via user interaction), an event handler 205 in the controller 204 of the client side component object 201 sends the changed data to the synchronization manager 306 in the client runtime 110. The synchronization manager 306 asynchronously collects and sends the changed data to the master controller 401 in the service runtime 160. The master controller 401 sends the changed data to the controller 402 or 403 for the corresponding component object in the server runtime 160. The controller 402 or 403 receives the changed data, updates its data container 406, and performs any other actions indicated by the controller's event handler. Such actions may include sending the data to the application 170, calling a function in the application 170, or querying the application 170. In addition, controller 402 or 403 receives data from the application 170, updates the data container 406 for the component object, and sends the updated data to master controller 401 in the service runtime 160. Master controller 401 sends a message to the synchronization manager 306 in the client runtime 110 that includes the updated data. The synchronization manager 306 in turn sends the updated data to the controller 302 or 303 for the client side component object. The controller 302 or 304 then writes the updated data to the client side data container 380 for the component object to complete the roundtrip data exchange for the refresh request.

Figure 5:
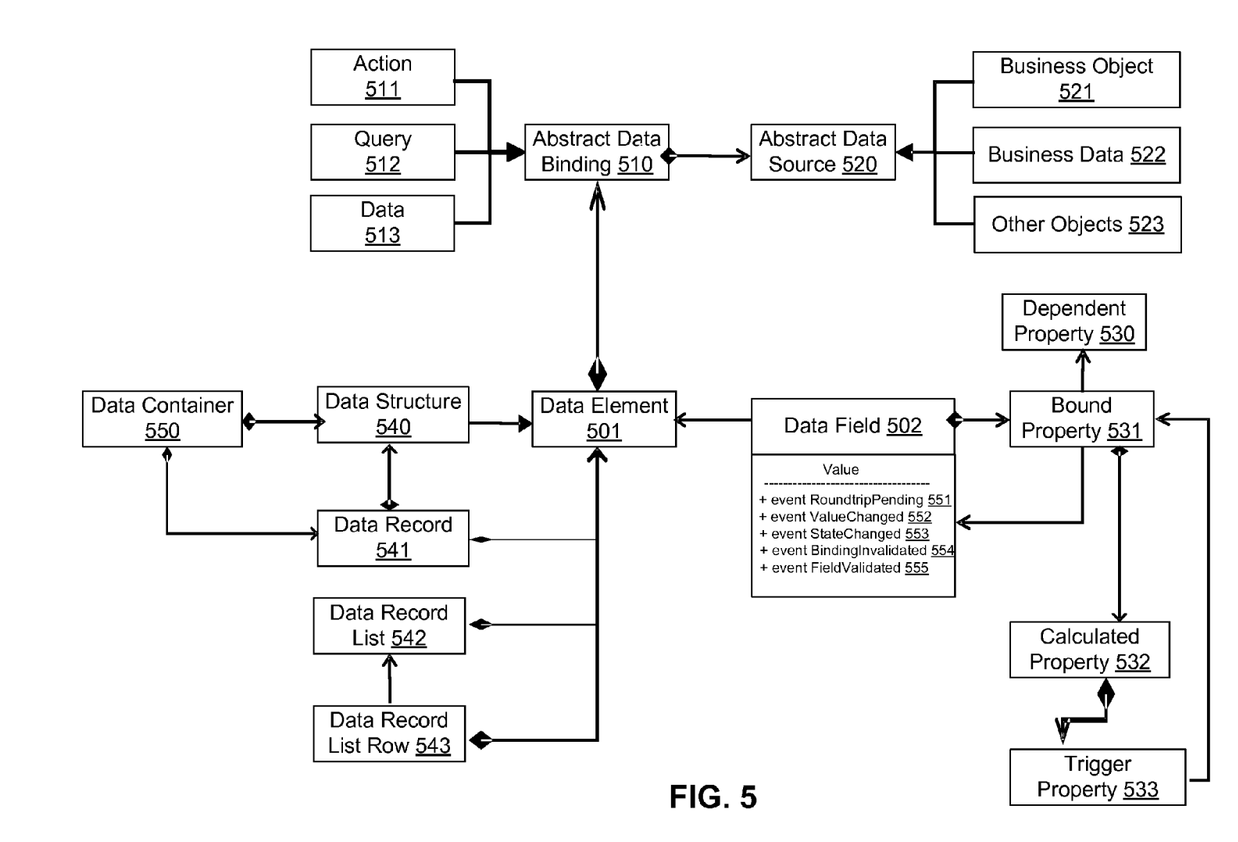
FIG. 5 is a schematic illustration of a class diagram showing the abstracted data model of a component object in the client runtime.

FIG. 5 is a schematic illustration of a class diagram showing the abstracted data model of a component object in the client runtime. The data model 202 defines the attributes for a data element 501 within a UI component object 201. For example, the data model 202 defines the binding 510 between the data element 501 and a data source 520. The data source 520 can be a backend application or business object 521 running on a remote server (e.g. application 170), an object or function within such an application 522, or another component object 523 in the client runtime 110. The binding 510 between the data element 501 and the data source 520 expresses a particular path to the data source 520. The path can be a call to particular function 511 within the data source 520, a query 512 of the data source 520, or a particular data object 513 or data element within the data source 520. Two-way data exchange can occur between the data element 501 and the data source 520 through these paths or data bindings 510.

As further shown in FIG. 5, each data element 501 can be part of an overall data structure 540 in the data model 202 of the component object 201. The client runtime 110 and server runtime 160 can access this data model 202 and data structure 540 through their respective data containers 550. For example, client runtime 110 can access the data model 202 of a component object 201 through its data container 380 as shown in FIG. 3, while server runtime 160 can access the data model 202 through its server side data container 406 shown in FIG. 4. The overall data structure 540 of the component object 201 allows individual data elements 501 to be collected and organized as data records 541, lists 542 or list rows 543.

As also shown in FIG. 5, each data element 501 includes a data field 502 that can hold the value of the data element. The value of the data field 502 can depend on or be bound to additional information or sources of data as indicated in a bound property field 531. For example, the value of the data field 502 can depend on the value of data in another data element as indicated in a dependent property field 530. In addition, the value of the data field 502 can depend on one or more calculations that are indicated in a calculated property field 532. The calculated property field 532 defines the calculations that are needed to compute the value of the data field 502 from the information available from the bound data source 520 and/or from any other data elements on which the value depends (e.g., as indicated in the dependent property field 530). When the value of the data field 502 in a component object 201 is bound through a calculation 532 or depends on data from another data element in another component object, one or more triggers 533 can be set to alert the client runtime 110 or service runtime 160 when the value of the data field 502 needs to be recomputed. For example, if the value of the data field 502 is the sum of the values from two or more independent data fields, a trigger 533 can alert the client runtime 110 or service runtime 160 to recompute the value of the data field 502 when the value of at least one of the independent data fields changes.

The calculated property field can be used to perform trivial calculations on the client computer 100 rather than on the server computer 150. This preserves bandwidth between the client and server computers. For example, the value of the data field 502 can be the age of a customer, and can depend on both the current date and the customer's birthday. Whenever information regarding the customer's birthday or the current date is changed, the customer's age can be recalculated by executing a script in the client runtime 110. The recalculated age and/or the changed birthday can then be sent to the corresponding component object in the server runtime 160. In this way, only a single data exchange between the client and server component objects is required. By contrast, were the age calculated in the server runtime 160, the updated customer birthday or current date would have to be sent from the client runtime 110 to the server runtime 160, the customer age calculated in the server runtime 160, and the updated customer age sent back to the client runtime 110, thus requiring two data exchanges between the client and server computers.

Finally, the data field 502 can also included a plurality of flags or indicators 551-555 that contain information regarding the status of the data in data field 502. In particular, a round-trip pending flag 551 can be set to indicate when the value stored in data field 502 has changed, and that change has been propagated from the component object 201 in the client runtime 110 to the corresponding component object 201 in the server runtime 160. A value change flag 552 can be set to signal a change in the value that is stored in data field 502. This value can change, for example, as a result of a recalculation triggered by a change in a dependent field. The value change flag 552 can be used to signal the synchronization manger 306 (FIG. 3) in the client runtime 110 or the master controller 401 (FIG. 4) in the server runtime 160. A state changed flag 553 can be set to signal when the state of the data value in the data field 502 has changed (e.g., from valid to invalid). A binding invalidated flag 554 can be set to indicate whether the binding 510 of the data element 501 to the data source 520 is valid. For example, the binding invalidated flag 554 can be set to invalid when the data source 520 (e.g., application 170) is unavailable. This flag can be used to insure that only data from a valid and up-to-date data source is used and displayed. Finally, a field validated flag 555 can be set to indicate when the value in the data field 502 is valid.

As discussed above, to improve system performance and preserve bandwidth on the communication channel between the client computer 100 and the server 150, only data that is currently needed or viewable is loaded from the backend application 170. For example, when data is needed from application 170 to populate a component object 201 on the client computer 100, the controller 204 for the component object 201 sends the current lead selection and other information from the current view 203 of the component object 201 to the server runtime 160. The server side component object 201 then uses this information to query the application 170 for only that data that is currently viewable in the client side view 203 of the component object 201. This is achieved by declaratively marking entities in the component object (e.g., event handlers, data elements) with their relevance in relation to application scoping decisions. This information is evaluated whenever the component object is initialized or populated with data to limit data transfer to only those elements in the component object that are viewable within the current scope of the client side user interface. Application scoping decisions can be made by the component object controller (e.g., scripts or actions) or by view calculation rules. In addition backend logic can be programmed to scope the component object so that only those data elements that are viewable in the client side user interface are initialized or populated with data.

Figure 6:
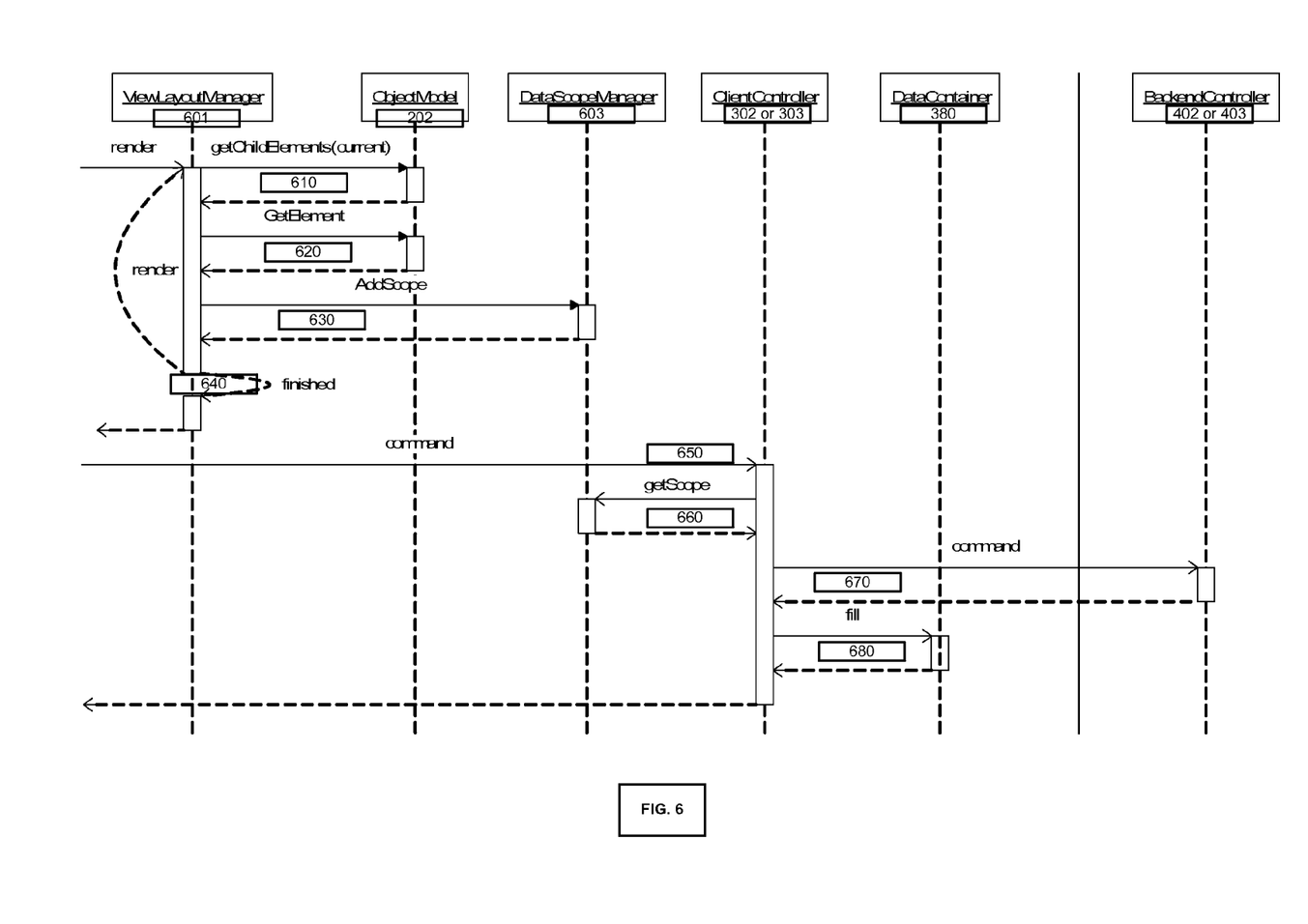
FIG. 6 is a flow chart showing the application of scoping decisions to the elements of a component object.

FIG. 6 is a flow chart showing the application of scoping decisions to the elements of a component object. As discussed above, each component object 201 in the client runtime 110 includes a data model 202, a view 203 and a controller 204. A master controller 300 within the client runtime 110 includes a component manager 301, component controllers 302 or 303, and a data container 380 for the component objects that are instantiated in the client runtime 110. To render a graphical user interface on the client computer 100, the master controller 300 renders each of the component objects 201 in the client runtime 110. The view 203 of each such component object 201 includes a view layout manager 601 (not shown in FIG. 2) that can render the component object 201 by sequentially rendering each element within the component object. This occurs through a multi-step process in which the view layout manager 601 first identifies each element in the component object's model (610), gets the element (620), and determines the scope of the element's view (630). To determine the scope of the element's view, the view layout manager 601 request's the scope from a data scope manager 603. The data scope manager 603 can use information contained within the component object itself, including view calculations, data dependencies and event handlers, to determine the scope of an element within a component object.

Depending on the scoping decision returned by the data scope manager 603, a given element of a component object may or may not be rendered by the view layout manager 601. If the decision of the data scope manager 603 is that the view of a current element is out of scope, the view layout manager 601 proceeds to identify (610), get (620), and scope the view (630) of the next element in the component object. If, however, the decision of the data scope manger 603 is that the view of the current element is in scope, the view layout manager 601 requests the component object's client side controller 302 or 303 to get data for the element (650). Before requesting the data from the corresponding server side controller, however, the client side controller 302 or 303 first determines the scope of the data request from the data scope manager (660). As noted above, the data scope manager 603 can use information contained within the component object itself, including dependencies and event handlers, to determine the scope of the data request. For example, as shown in FIG. 5, the data scope manager 603 can check one or more of the flags 551-555 to determine the scope of the data request. Thus, for example, if the binding invalidated flag 554 is set, the data scope manager 603 can determine that the data request is invalid or out of scope.

If the client side controller 302 or 303 determines that the data request for the current element is out of scope, it does not request the data from its corresponding server side controller 402 or 403. If, however, the client side controller 302 or 303 determines that the data request is in scope, it requests the data for the current data element from its corresponding server side controller (670). The server side controller 402 or 403 in turn requests the data from a server side data source such as the backend application 170, and returns the data to the client side controller 302 or 303. The client side controller 302 or 303 in turn writes the data to the client side component object's data container 380 (680).

Figure 7:
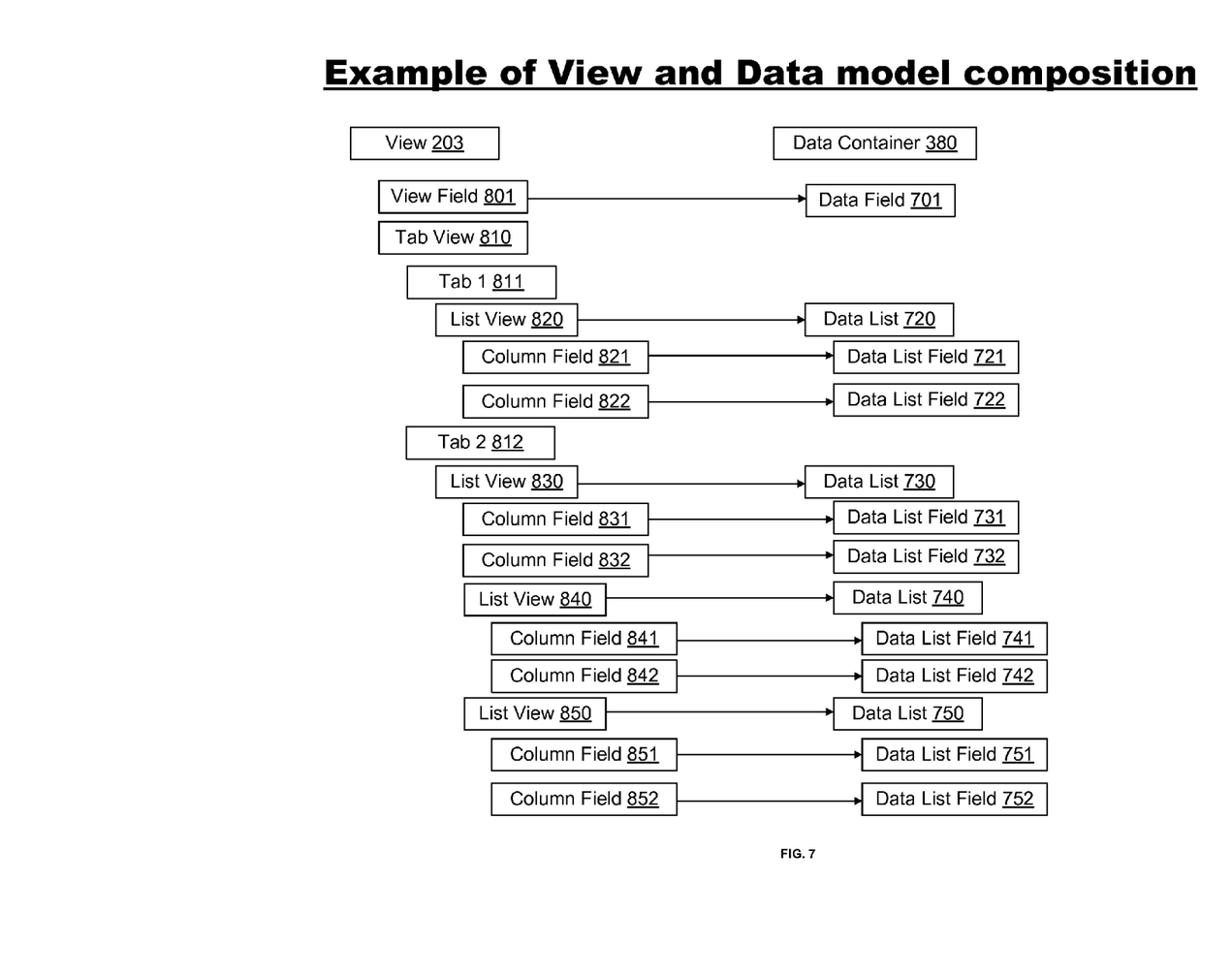
FIG. 7 is a block diagram showing how user interaction and scoping decisions can alter a user's view of a component object's data.

FIG. 7 is a block diagram showing how user interaction and scoping decisions can alter a user's view of a component object's data. As shown in FIG. 7, a component object 201 has a view 203 and a data model 202 that organizes the data held in a client side data container 380. The component object's data model 202 contains three primary data elements: a data field 701, a data list 720 that includes two data list fields 721 and 722, and a data list 730 that includes two data list fields 731 and 732 and two child data lists 740 and 750. The child data list 740 includes additional data list fields 741 and 742, while the child data list 750 includes additional data list fields 751 and 752.

The elements of the component object's data model 202 are mapped into the component object's view model 203. As shown in FIG. 7, the component object's view model 203 primarily consists of a data view 801 and a tab strip 810. The data view 801 is linked to and populated with data from the data field 701. By contrast, the tab strip 810 is not linked to any data elements and therefore does not contain any data from the component object's data model 202. Instead, it contains two additional view elements, a tab 811 and a tab 812, neither of which are linked to nor contain data from a data element within the component object's data model 202. Instead, the tab 811 displays a list view 820 having two columns 821 and 822, while the tab 812 displays a list view 830 having two columns 831 and 832 and two child list views 840 and 850. The list view 820, which is only displayed when the tab 811 is selected, is linked to and populated with data from the data list 720 such that each of the data list fields 721 and 722 are respectively displayed in the columns 821 and 822 of the list view 820. Similarly, the list view 830, which is only displayed when the tab 812 is selected, is linked to and populated with data from the data list 730 such that the data list fields 731 and 732 are respectively displayed in the columns 831 and 832. In addition, when the child list view 840 is selected, the data list fields 741 and 742 of the data list 740 are respectively displayed in the columns 841 and 842, while when the child list view 850 is selected, the data list fields 751 and 752 of the data list 750 are respectively displayed in the columns 851 and 852.

As discussed in reference to FIG. 6 above, depending on the current view state of the component object 201, only certain elements within the view 203 of the component object 201 will be visible in the user interface. For example, if a user selects or makes tab 811 the current lead selection or focus of the component object's view 203, the only elements in the component object's view 203 that will be populated with data and viewable will be the data view 801, the tab strip 810, the tabs 811 and 812, and the two columns 821 and 822 of the list 820 that is revealed when the tab 811 is selected. These elements of the component object's view 203 will be populated with data from the data elements in the component object's data model 202 to which they are mapped. For example, the data view 801 will be populated with data from the data field 701, and the two columns 821 and 822 of the list 820 will be respectively populated with data from the list fields 721 and 722 of the data list 720. The list view 830 that lies "behind" tab 812 will not be visible, nor will the data (if any) in data list 730. Should a refresh of component object 201 be requested while the component object is in this view state, only the currently viewable data in the data view 801 (i.e., data field 701) and the list view 820 (i.e., data list 720) will be determined by the data scope manager 603 (FIG. 6) to be within the scope of the refresh request. Consequently the client side controller 302 or 303 for the component object 201 will only request the data field 701 and the data list 720 from the server side controller 402 or 403.

However, as shown in FIG. 7, if the user switches the current focus of the component object's view 203 so that the current lead selection or focus is on the child view list 840 under tab 812, the only elements in the component object's view 203 that will be populated with data and viewable will be the data view 801, the tab strip 810, the tabs 811 and 812, the two columns 831 and 832 and the two child list views 840 and 850 of the list view 830 that is revealed since the tab 812 is selected, and the two columns 841 and 842 that are revealed since the child list view 840 is selected. As before, these elements of the component object's view 203 will be populated with data from the data elements in the component object's data model 202 to which they are mapped. Thus, the data view 801 will be populated with data from data field 701, the two columns 831 and 832 of the list view 830 will be respectively populated with data from the list data fields 731 and 732 of the data list 730, and the two columns 841 and 842 will be respectively populated with data from the list data fields 741 and 742 of the data list 740. The list view 820 that lies "behind" tab 811 will not be visible, nor will the data (if any) in data list 720. Likewise, while the child list view 850 will be visible since the tab 812 has been selected, the columns 851 and 852 of the child list view 850 will not be visible since the child list view 850 has not been selected. As before, should a refresh of component object 201 be requested while the component object is in this view state, only the currently viewable data in the data view 801 (i.e., data field 701) and the list view 830 (i.e., data list fields 731, 732, 741 and 742) will be determined by the data scope manager 603 (FIG. 6) to be within the scope of the refresh request. Consequently the client side controller 302 or 303 for the component object 201 will only request data for the data field 701 and the data list fields 731, 732, 741 and 742 from the server side controller 402 or 403.

As a final example, if the user switches the current focus of the component object's view 203 so that the current lead selection or focus is on the child list view 850 under tab 812, the only elements in the component object's view 203 that will be populated with data and viewable will be the data view 801, the tab strip 810, the tabs 811 and 812, the two columns 831 and 832 and the two child list views 840 and 850 of the list view 830 that is revealed since the tab 812 is selected, and the two columns 851 and 852 that are revealed since the child list view 850 is selected. As before, these elements of the component object's view 203 will be populated with data from the data elements in the component object's data model 202 to which they are mapped. Thus, the data view 801 will be populated with data from data field 701, the two columns 831 and 832 of the list view 830 will be respectively populated with data from the list data fields 731 and 732 of the data list 730, and the two columns 851 and 852 will be respectively populated with data from the list data fields 751 and 752 of the data list 750. The list view 820 that lies "behind" tab 811 will not be visible, nor will the data (if any) in data list 720. Likewise, while the child list view 840 will be visible since the tab 812 has been selected, the columns 841 and 842 of the child list view 840 will not be visible since the child list view 840 has not been selected. As before, should a refresh of component object 201 be requested while the component object is in this view state, only the currently viewable data in the data view 801 (i.e., data field 701) and the list view 830 (i.e., data list fields 731, 732, 751 and 752) will be determined by the data scope manager 603 (FIG. 6) to be within the scope of the refresh request. Consequently the client side controller 302 or 303 for the component object 201 will only request data for the data field 701 and the data list fields 731, 732, 751 and 752 from the server side controller 402 or 403.

The methods and apparatus described herein may be implemented in digital electronic circuitry, or in computer hardware, firmware, software, or in combinations of them. They may be implemented as a computer program product, i.e., as a computer program tangibly embodied in a non-transitory machine-readable storage device for execution by, or to control the operation of, a processor, a computer, or multiple computers. Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit). The method steps may be performed in the order shown or in alternative orders.

A computer program, such as the computer program(s) described above, can be written in any form of programming language, including compiled or interpreted languages, and can be deployed in any form, including as a stand-alone program or as a module, component, subroutine, plug-in or other unit suitable for use in a computing environment. A computer program can be deployed to be executed on one computer or on multiple computers at one site or distributed across multiple sites and interconnected by a communications network. Processors suitable for the execution of a computer program include, by way of example, both general and special purpose microprocessors, and any one or more processors of any kind of digital computer, including digital signal processors. Generally, a processor will receive instructions and data from a read-only memory or a random access memory or both.

Elements of a computer may include at least one processor for executing instructions and one or more memory devices for storing instructions and data. Generally, a computer may also include, or be operatively coupled to receive data from and/or transfer data to one or more mass storage devices for storing data, e.g., magnetic, magneto-optical disks, or optical disks. Machine readable media suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, the methods and apparatus may be implemented on a computer having a display device, e.g., a cathode ray tube (CRT) or liquid crystal display (LCD) monitor, for displaying information to the user and a keyboard and a pointing device, e.g., a mouse, trackball or touch pad, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The methods and apparatus described may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer implemented method for displaying objects in a graphical user interface that allows a user of a client computer to graphically interact with and control an application running on a backend server, the method comprising:
   receiving at the client computer a lead selection and a component object related to the application running on the backend server for display on the graphical user interface of the client computer, wherein the component object has a data model, a view and a client-side controller, and wherein the component object includes one or more elements conforming to the data model; and
   sequentially rendering one or more elements within the component object on the graphical user interface,
   wherein the sequentially rendering one or more elements within the component object includes:
      identifying a particular element in the component object's model, and determining a scope of view of the particular element based on the lead selection and information contained within the component object, wherein the information includes view calculations, data dependencies and event handlers;
      deciding whether to render or not render the particular element of the component object based on a scope of the particular element's view;
      if the particular element is out of the scope of view then not requesting data for the particular element from the application running on the backend server, instead identifying a next element in the component object, and determining a scope of the next element's view; and
      only if the particular element is in the scope of view, requesting the component object's client side controller to get data for the particular element from the application running on the backend server and rendering the particular element on the graphical user interface on the client computer.

2. The computer implemented method of claim 1, wherein deciding whether to render or not render the particular element of the component object based on the scope of the particular element's view includes a determination of whether the component object is at least partially viewable in the graphical user interface based on declaratively marked elements in the view of the component object.

3. The computer implemented method of claim 2, wherein the determination of whether the component object is at least partially viewable in the graphical user interface is made by an event handler in the component object.

4. The computer implemented method of claim 3, wherein the determination of whether the component object is at least partially viewable in the graphical user interface is based on view calculation rules.

5. The computer implemented method of claim 1, further comprising a determination of whether data for at least one data field is needed to render the component object based on declaratively marked elements in a data model of the component object.

6. The computer implemented method of claim 5, wherein the determination of whether data for the at least one data field is needed to render the component object is made by an event handler in the component object.

7. The computer implemented method of claim 5, wherein the determination of whether data for the at least one data field is needed to render the component object is based on a flag in the data model indicating whether the data field is valid.

8. The computer implemented method of claim 5, wherein the determination of whether data for the at least one data field is needed to render the component object is based on a flag in the data model indicating whether a binding of the data field to a data source is valid.

9. A computer program product, tangibly embodied on a non-transitory machine readable medium, comprising instructions for causing a programmable processor to allow a user of a client computer to graphically interact with and control an application running on a backend server, the instructions causing the programmable processor to:
   receive a lead selection and a component object related to the application running on the backend server for display on the graphical user interface of the client computer, wherein the component object has a view and a client-side controller; and
   sequentially render one or more elements within the component object on the graphical user interface,
   wherein the sequentially rendering one or more elements within the component object includes:
      identifying a particular element in the component object's model, and determining a scope of view of the particular element based on the lead selection and information contained within the component object, wherein the information includes view calculations, data dependencies and event handlers;
      deciding whether to render or not render the particular element of the component object based on the scope of the particular element's view;
      if the particular element is out of the scope of view then not requesting data for the particular element from the application running on the backend server, instead identifying a next element in the component object, and determining a scope of the next element's view; and
      only if the particular element is in the scope of view, requesting the component object's client side controller to get data for the particular element from the application running on the backend server and rendering the particular element on the graphical user interface on the client computer.

10. The computer program product of claim 9, wherein deciding whether to render or not render the particular element of the component object based on the scope of the particular element's view includes a determination of whether the component object is at least partially viewable in the graphical user interface based on declaratively marked elements in the view of the component object.

11. The computer program product of claim 9, wherein the determination of whether the component object is at least partially viewable in the graphical user interface is based on view calculation rules.

12. The computer program product of claim 9, further comprising a determination of whether data for at least one data field is needed to render the component object based on declaratively marked elements in the data model of the component object.

13. The computer program product of claim 12, wherein the determination of whether data for the at least one data field is needed to render the component object is based on a flag in the data model indicating whether the data field is valid.

14. The computer program product of claim 12, wherein the determination of whether data for the at least one data field is needed to render the component object is based on a flag in the data model indicating whether a binding of the data field to a data source is valid.

15. A system configured to allow a user of a client computer to graphically interact with and control an application running on a backend server, the system comprising one or more processors loaded with computer instructions that execute on the one or more processors causing the one or more processors to: receive a lead selection and a component object related to the application running on the backend server for display on the graphical user interface of the client computer, wherein the component object has a view and a client-side controller; and     sequentially render one or more elements within the component object on the graphical user interface,     wherein the sequentially rendering one or more elements within the component object includes:

identifying a particular element in the component object's model, and determining a scope of view of the particular element based on the lead selection and information contained within the component object, wherein the information includes view calculations, data dependencies and event handlers;

deciding whether to render or not render the particular element of the component object based on the scope of the particular element's view;

if the particular element is out of the scope of view then not requesting data for the particular element from the application running on the backend server, instead identifying a next element in the component object, and determining a scope of the next element's view; and         only if the particular element is in the scope of view, requesting the component object's client side controller to get data for the particular element from the application running on the backend server and rendering the particular element on the graphical user interface on the client computer.

16. The system of claim 15, wherein the computer instructions that execute on the one or more processors cause the one or more processors to determine whether the component object is at least partially viewable in the graphical user interface based on declaratively marked elements in the view of the component object.

17. The system of claim 16, wherein the computer instructions that execute on the one or more processors cause the one or more processors to use view calculation rules within the view of the component object to determine whether the component object is at least partially viewable in the graphical user interface.

18. The system of claim 15, wherein the computer instructions that execute on the one or more processors cause the one or more processors to determine whether data for at least one data field is needed to render the component object based on declaratively marked elements within the data model of the component object.

19. The system of claim 18, wherein the computer instructions that execute on the one or more processors cause the one or more processors to use a flag in the data model indicating whether the data field is valid to determine whether data for the at least one data field is needed to render the component object.

20. The system of claim 18, wherein the computer instructions that execute on the one or more processors cause the one or more processors to use a flag in the data model indicating whether a-binding of the data field to a data source is valid to determine whether data for the at least one data field is needed to render the component object.

* * * * *